United States Patent
Li et al.

(10) Patent No.: US 10,893,022 B1
(45) Date of Patent: Jan. 12, 2021

(54) ROUTING PROTOCOL SECURITY USING A DISTRIBUTED LEDGER

(71) Applicant: Equinix, Inc., Redwood City, CA (US)

(72) Inventors: Danjue Li, Dublin, CA (US); Muhammad Durrani, San Jose, CA (US); Chen Xi, Singapore (SG); Imam Sheikh, Redwood City, CA (US)

(73) Assignee: EQUINIX, INC., Redwood City, CA (US)

( * ) Notice: Subject to any disclaimer, the term of this patent is extended or adjusted under 35 U.S.C. 154(b) by 251 days.

(21) Appl. No.: 16/228,540

(22) Filed: Dec. 20, 2018

(51) Int. Cl.
*H04L 29/06* (2006.01)
*H04L 12/745* (2013.01)
*H04L 29/08* (2006.01)

(52) U.S. Cl.
CPC ........ *H04L 63/0209* (2013.01); *H04L 45/748* (2013.01); *H04L 67/104* (2013.01); *H04L 69/18* (2013.01)

(58) Field of Classification Search
CPC .................................................. H04L 63/0209
USPC ........................................................... 726/14
See application file for complete search history.

(56) References Cited

U.S. PATENT DOCUMENTS

| | | | | |
|---|---|---|---|---|
| 7,854,001 B1 * | 12/2010 | Chen | .................... | H04L 63/1483 726/22 |
| 8,018,873 B1 * | 9/2011 | Kompella | ............... | H04L 45/00 370/254 |
| 8,327,002 B1 * | 12/2012 | Van Dussen | ............ | H04L 41/00 709/228 |
| 8,909,736 B1 * | 12/2014 | Bosch | .................. | H04L 65/4084 709/217 |
| 8,954,491 B1 * | 2/2015 | Medved | .............. | H04L 41/0836 709/203 |
| 9,886,267 B2 | 2/2018 | Maheshwari et al. | | |
| 9,935,816 B1 * | 4/2018 | Chen | ....................... | H04L 45/04 |
| 9,948,552 B2 | 4/2018 | Teng et al. | | |

(Continued)

OTHER PUBLICATIONS

Fox-Brewster, "A $152,000 Cryptocurrency Theft Just Exploited a Huge 'Blind Spot' in Internet Security," forbes.com, Apr. 24, 2018, 3 pp.

(Continued)

*Primary Examiner* — Ondrej C Vostal
(74) *Attorney, Agent, or Firm* — Shumaker & Sieffert, P.A.

(57) ABSTRACT

In one example, a method includes receiving, by a first network device via a routing protocol peering session with a peer router in a first autonomous system, a plurality of routing protocol routes to destination addresses, each routing protocol route specifying a network address prefix and an identifier of the autonomous system that originated the routing protocol route; receiving network address prefix ownership information from a distributed ledger storing a plurality of associations between respective network address prefixes and respective autonomous system identifiers of autonomous systems confirmed to own the respective network address prefixes; determining, based at least on the prefix ownership information, whether any of the plurality of routing protocol routes specifies an autonomous system identifier different than specified by the associations; and in response to determining that one of the routes specifies an autonomous system identifier different than specified by the plurality of associations, performing an action.

20 Claims, 4 Drawing Sheets

(56) References Cited

U.S. PATENT DOCUMENTS

| | | | |
|---|---|---|---|
| 2004/0039839 A1* | 2/2004 | Kalyanaraman | H04L 45/00 709/238 |
| 2006/0272018 A1* | 11/2006 | Fouant | H04L 63/1425 726/23 |
| 2007/0153763 A1* | 7/2007 | Rampolla | H04L 45/28 370/351 |
| 2007/0206605 A1* | 9/2007 | Ansari | H04L 45/745 370/395.5 |
| 2011/0134826 A1* | 6/2011 | Yang | H04W 76/12 370/315 |
| 2015/0341310 A1* | 11/2015 | You | H04L 61/2007 709/245 |
| 2016/0359699 A1* | 12/2016 | Gandham | G06F 16/288 |
| 2016/0359706 A1* | 12/2016 | Maddux | H04L 43/065 |
| 2017/0026288 A1* | 1/2017 | Yang | H04L 45/745 |
| 2017/0041332 A1* | 2/2017 | Mahjoub | H04L 43/0876 |
| 2017/0324738 A1 | 11/2017 | Hari et al. | |
| 2020/0007548 A1* | 1/2020 | Sanghavi | H04L 61/256 |

OTHER PUBLICATIONS

"Arin's Internet Routing Registry (IRR)," retrieved from https://www.arin.net/resources/manage/irr/ on Jul. 26, 2018, 3 pp.

De La Rocha et al., "Blockchain-based Public Key Infrastructure for Inter-Domain Secure Routing," International Workshop on Open Problems in Network Security (iNetSec), May 2017, pp. 20-38.

Paillisse et al., "An Analysis of the Applicability of Blockchain to Secure IP Addresses Allocation, Delegation, and Bindings," Network Working Group Internet Draft, draft-paillisse-sidrops-blockchain-01.txt, Oct. 29, 2017, 23 pp.

Rekhter et al., "A Border Gateway Protocol 4 (BGP-4)," RFC 4271, Network Working Group, Jan. 2006, 104 pp.

\* cited by examiner

ROUTING PROTOCOL SECURITY USING A DISTRIBUTED LEDGER

TECHNICAL FIELD

The disclosure relates to network communications, more specifically to routing protocols.

BACKGROUND

Routing protocols, such as Border Gateway Protocol (BGP), enable routing devices to exchange routing information. For example, border routers of an autonomous system (AS) can share routing information with routers in other autonomous systems via exterior BGP route advertisements. The AS is an administrative domain consisting of a connected group of routers having Internet Protocol (IP) addresses under at least one network address prefix (e.g., at least one IP prefix). An autonomous system is owned by a network operator, such as a network service provider. Internet Service Providers (ISPs) often use BGP to establish peering relationships among different ISPs' routers and advertise and/or exchange reachable routes through the autonomous system. As a result, the routers learn the best way to route traffic and reach final destinations. BGP may also be used between Cloud Service Providers (CSPs) and enterprise networks to establish peering sessions for enterprises to consume CSP services, often via at least one ISP network.

Upon establishing BGP peering sessions, peer routers exchange routes via the BGP peering sessions. The routers store the routes in a database called a Routing Information Base (RIB) or routing table. Each route may include at least one destination IP address, which may be expressed in terms of an IP prefix. The prefix refers to a set of IP addresses/ranges denoted by a prefix portion of an IP address that covers the set of IP addresses. In some examples, a route may include a prefix length or subnet mask, and may include a set of information indicating policies and preferences to reach the destination indicated by the prefix.

An ISP typically owns (e.g., leases or is otherwise allocated) a collection of IP prefixes. Internet Routing Registries contain information about autonomous system identifiers (e.g., autonomous numbers (ASNs)) and corresponding IP prefixes owned by the corresponding autonomous system. The Internet Routing Registries may be managed by ISPs or other entities. The ASN is uniquely allocated to identify each autonomous system and must be officially registered for use in BGP routing. Internet Routing Registries can also be used by ISPs to develop routing plans. For example, by setting BGP policies via route filtering (e.g., using Network Layer Reachability Information, AS Path, and Community attributes), ISPs can permit or deny traffic in their networks based on Internet routing registry information.

SUMMARY

In general, the disclosure describes a distributed ledger-based route validation system to enhance routing protocol security. A routing protocol, such as BGP, allows routers in different autonomous systems to exchange routes within and between the autonomous systems. The route validation system of the disclosure uses a distributed ledger, e.g., a blockchain, to store network address prefix ownership information indicating ownership of network address prefixes by autonomous systems. The stored network address prefix ownership information may be encrypted on the distributed ledger. The route validation system includes a plurality of routing protocol security engines, each assigned to a different autonomous system. The routing protocol security engines run routing protocol peering sessions with one or more routers in their respective autonomous systems to listen for and obtain routes for the autonomous system.

In some examples, each of the routing protocol security engines operates as a peer node of the distributed ledger and stores a copy of the distributed ledger locally. In other examples, the routing protocol security engines are not nodes of the distributed ledger and obtain network address prefix ownership information for specific routes from other devices operating as nodes of distributed ledger. In some examples, the routing protocol security engines of each autonomous system communicate and collaborate with each other to share information, such as information about valid network addresses (e.g., IP addresses). In some examples, artificial intelligence (AI) threat detection techniques are applied to analyze routes over time and detect patterns in route refreshing and updates.

The routing protocol security engine obtains network address prefix ownership information from the distributed ledger and validates received routes against the network address prefix ownership information. The routing protocol security engine may also account for threat patterns learned from the AI threat detection to detect illegitimate routes. For example, the routing protocol security engine may query the network address prefix ownership information to determine that an autonomous system that originated a route does not match the autonomous system recorded in the distributed ledger as owning the network address prefix of the route and, in response, the routing protocol security engine may perform an action, such as issuing an alert to a network operator to flag the mismatched route. In this manner, the techniques provide enhanced routing protocol security and decrease the likelihood of routing network traffic to an autonomous system that does not own the matching destination network address prefix.

The techniques of this disclosure may provide one or more technical advantages. For example, because the route validation system exists on devices separate from the routers in the autonomous systems, and the devices do not route traffic or advertise routes, the route validation system described herein does not affect current operations of routers in the autonomous systems. The techniques of this disclosure may avoid service disruptions caused by routing protocol attacks or inadvertently rerouted traffic due to network operator errors. As another example, the techniques of this disclosure allow for "runtime" authorization of network address prefix ownership, thereby quickly detecting improper routes, which may avoid or decrease an amount of time that network traffic is being mis-routed based on the improper routes. Because of the immutability of information stored to a distributed ledger, using a distributed ledger to store the network address prefix ownership and designating trustees for adding network address prefix ownership information to the distributed ledger may facilitate the integrity and validity of the network address prefix ownership information. As another example, the decentralized nature of a distributed ledger may provide secure, low-latency network address prefix ownership information to routing protocol security engines as described herein, which are distributed (both logically and geographically) among respective autonomous systems, thereby improving the rapidity at which prefixes can be validated (and errors may be identified) for each autonomous system's routing table.

In one example, a method includes receiving, by a first network device via a routing protocol peering session with a peer router in a first autonomous system, a plurality of routing protocol routes to destination addresses, each routing protocol route of the plurality of routing protocol routes specifying a network address prefix and an identifier of the autonomous system that originated the routing protocol route; receiving, by the first network device, network address prefix ownership information from a distributed ledger storing a plurality of associations between respective network address prefixes and respective autonomous system identifiers of autonomous systems confirmed to own the respective network address prefixes; receiving, by the first network device from a second network device associated with a second autonomous system, threat pattern data indicating patterns in routing protocol route changes in the second autonomous system; determining, by the first network device and based at least on the network address prefix ownership information and the threat pattern data, whether any of the plurality of routing protocol routes specifies an autonomous system identifier different than specified by the plurality of associations; and in response to determining that a route of the plurality of routing protocol routes specifies an autonomous system identifier different than specified by the plurality of associations, performing, by the first network device, an action.

In another example, a system includes a plurality of autonomous systems, each comprising a corresponding plurality of routers exchanging routing information via routing protocol advertisements; a distributed ledger storing a plurality of associations between respective network address prefixes and autonomous system identifiers of the autonomous systems of the plurality of autonomous systems that are confirmed to own the associated network address prefixes; a plurality of routing protocol security engines, each associated with a corresponding one of the plurality of autonomous systems. Each of the plurality of routing protocol security engines comprises: processing circuitry operable to: receive, via a routing protocol peering session with a peer router in a particular autonomous system of the plurality of autonomous systems, a plurality of routing protocol routes to destination addresses, each routing protocol route of the plurality of routing protocol routes specifying a network address prefix and an identifier of the autonomous system that originated the routing protocol route; receive network address prefix ownership information from a distributed ledger storing a plurality of associations between respective network address prefixes and respective autonomous system identifiers of autonomous systems confirmed to own the respective network address prefixes; receive from a different one of the plurality of routing protocol security engines associated with a second autonomous system of the plurality of autonomous systems, threat pattern data indicating patterns in routing protocol route changes in the second autonomous system; determine based at least on the network address prefix ownership information and the threat pattern data, whether any of the plurality of routing protocol routes specifies an autonomous system identifier different than specified by the plurality of associations; and in response to determining that a route of the plurality of routing protocol routes specifies an autonomous system identifier different than specified by the plurality of associations, performing an action.

In a further example, a computer-readable storage medium is encoded with instructions for causing one or more programmable processors of a first network device to: receive, via a routing protocol peering session with a peer router in a first autonomous system, a plurality of routing protocol routes to destination addresses, each routing protocol route of the plurality of routing protocol routes specifying a network address prefix and an identifier of the autonomous system that originated the routing protocol route; receive network address prefix ownership information from a distributed ledger storing a plurality of associations between respective network address prefixes and respective autonomous system identifiers of autonomous systems confirmed to own the respective network address prefixes; receive, from a second network device associated with a second autonomous system, threat pattern data indicating patterns in routing protocol route changes in the second autonomous system; determine, based at least on the network address prefix ownership information and the threat pattern data, whether any of the plurality of routing protocol routes specifies an autonomous system identifier different than specified by the plurality of associations; and in response to determining that a route of the plurality of routing protocol routes specifies an autonomous system identifier different than specified by the plurality of associations, perform an action.

The details of one or more examples are set forth in the accompanying drawings and the description below. Other features, objects, and advantages will be apparent from the description and drawings, and from the claims.

DETAILED DESCRIPTION

Figure 1:
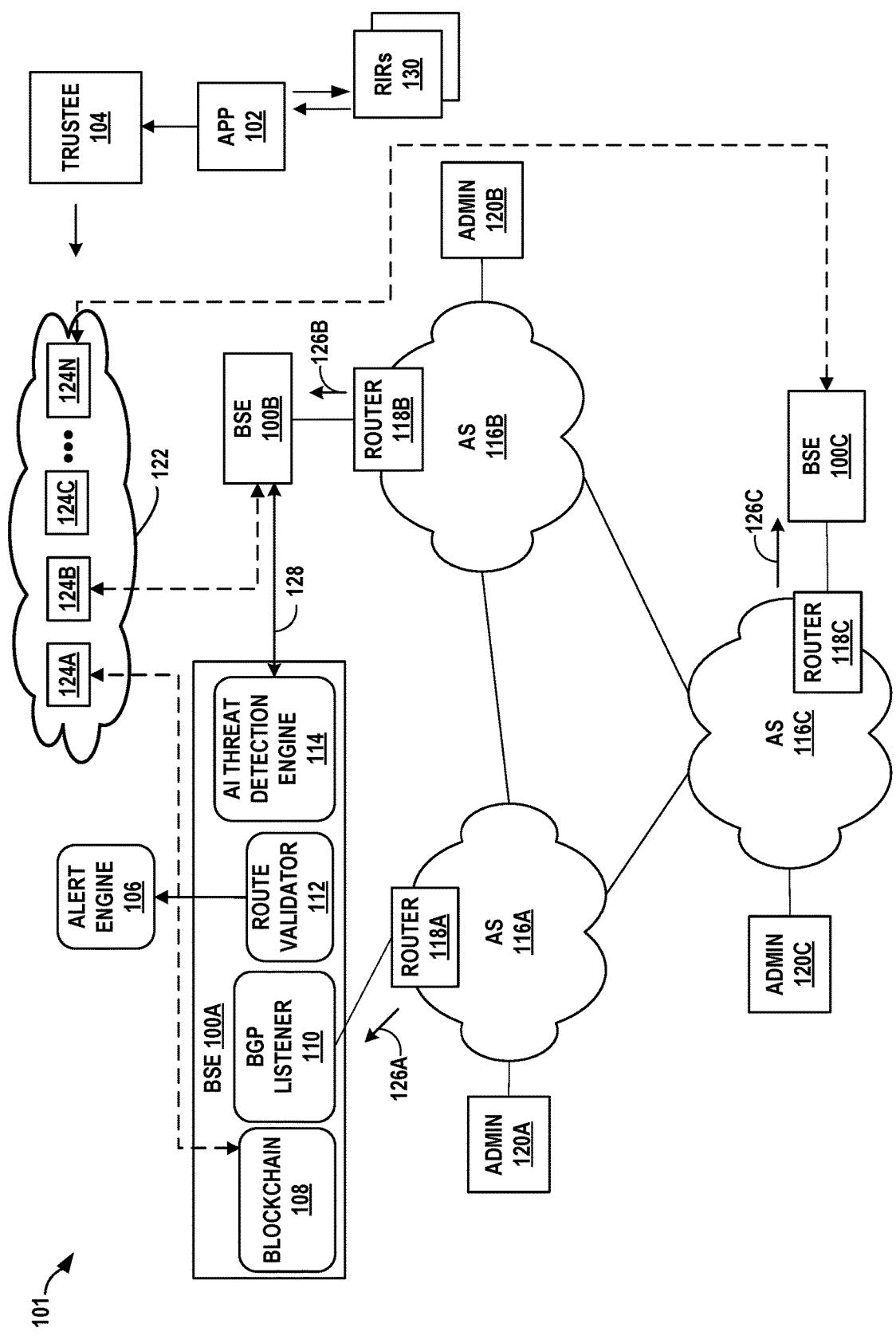
FIG. 1 is a block diagram illustrating an example system including autonomous systems and routing protocol security engines and routing protocol security engines, in accordance with aspects of the techniques of this disclosure.

FIG. 1 is a block diagram illustrating an example system 101 including autonomous systems 116A-116C ("autonomous systems 116") and routing protocol security engines in accordance with aspects of the techniques of this disclosure. The routing protocol security engines are referred to as "BGP security engines" (BSEs) 100 in the example of FIG. 1 for purposes of example. The routing protocol security engines may validate routes according to other routing protocols in some examples. Each of autonomous systems 116 is a collection of network devices (e.g., routers) having network prefixes and routing policies under a common administrative control. In the example of FIG. 1, each of autonomous systems 116 is administered by different respective administrators 120A, 120B, 120C (collectively, "ADMINS 120"). Each AS 116 owns or leases a set of one or more network prefixes (e.g., IP prefixes) and advertises routes for those prefixes.

In the example of FIG. 1, system 101 includes a consensus network 122 that includes a set of nodes 124A-124N (collectively, "nodes 124") that collectively implement a distributed ledger. A distributed ledger uses distributed and decentralized database technology. A distributed ledger is a data structure that may be shared and synchronized across a network spanning multiple sites, institutions, and/or geographies, which can record transactions between parties efficiently and in a verifiable and permanent way.

Each of nodes 124, shown within consensus network 122, may be implemented as any suitable computing system, such as one or more server computers, workstations, mainframes, appliances, cloud computing systems, and/or other computing systems that may be capable of performing operations and/or functions described in accordance with one or more aspects of the present disclosure. Nodes 124 may be geographically separate from one another but communicate via one or more networks. One or more of nodes 124 may, in some examples, represent a real or virtual server, a cloud computing system, server farm, and/or server cluster (or portion thereof) that provides services to client devices and other devices or systems. In other examples, nodes 124 may represent or be implemented through one or more virtualized compute instances (e.g., virtual machines, containers) of a data center, cloud computing system, server farm, and/or server cluster. In some examples, any or all of nodes 124 may be implemented as Ethereum virtual machines. In some examples, any or all of nodes 124 may be implemented as Hyperledger Fabric containers.

In some examples, the distributed ledger provided by consensus network 122 is a blockchain, with nodes 124 representing nodes on the blockchain. Blockchain is a form of distributed ledger technology. A blockchain is a shared transactional database that includes a plurality of blocks, each block (other than the route) referencing at least one block created at an earlier time, each block bundling one or more transactions registered with the blockchain, and each block cryptographically secured. Each block of the blockchain typically contains a hash pointer as a link to a previous block, a timestamp, and the transaction data for the transactions. By design, blockchains are inherently resistant to modification of the transaction data such that the transaction data is immutable. On the blockchain, copies of the transaction data are dispersed to all of nodes 124. Each peer, or node 124, on the consensus network 122 may maintain a copy of at least some of the ledger, and uses additional measures to help ensure consensus among a majority of the nodes 124 on the consensus network 122. This ensures there is no single controlling user or administrator. Additionally, records that are put on blocks on the chain are not updatable. In other words, the blockchain is an append-only ledger, wherein to update existing information on the chain, a new block is added with those updates. Changes or additions made to the ledger are reflected and copied to many, if not all, of nodes 124. The blockchain has a single global logical schema stored via multiple distributed physical copies. The blockchain may be considered an application-level network with nodes that correspond to highly distributed physical copies of a ledger.

The blockchain may be a permissioned public blockchain or a private blockchain, for example. In a permissioned public blockchain, the blockchain is public but only permissioned participants can write to or read from the blockchain. In the example of FIG. 1, nodes 124 store encrypted network address prefix ownership information. Trustee 104 is authorized to publish network address prefix ownership information onto blockchain 108. Trustee 104 may also be referred to as an "endorser." An application ("APP") 102 can publish information onto the blockchain only via an authorized trustee 104 that is authorized to publish onto the blockchain maintained by nodes 124. As a result, in this example system, no random user or application is allowed to insert erroneous information onto the blockchain. Application 102 comprises logic implemented to periodically pull network address prefix ownership information from regional internet registries (RIRs) 130 for different regions. For example, application 102 may query the RIRs using application programming interfaces (APIs) to obtain the IP prefix information. In some examples, the network address prefix ownership information includes at least a prefix, an associated AS number, and a customer name. Application 102 may encrypt the information and publish/store that information in a distributed ledger of the blockchain via the trustee 104 of the blockchain.

Although described for purposes of example with respect to blockchain, in other examples, non-blockchain distributed ledger implementations may be used consistent with the techniques of this disclosure. In some examples an immutable database may be used in place of blockchain. The purpose of the immutable database is to ensure that when a record is inserted, the record cannot be changed. Immutability enhances the security because erroneous prefix information may be less likely to be inserted into the database.

Each of autonomous systems 116 has an associated one or more BGP security engines (BSEs) 100A-100C ("BSEs 100"). In some examples, an autonomous system may have multiple BGP security engines, e.g., to provide redundancy. BSEs 100 obtain information from the blockchain/distributed ledger maintained by nodes 124 of consensus network 122. In the example of FIG. 1, only BSE 100A is shown in detail, but each of BSEs 100 may contain similar components as BSE 100A. In the example of FIG. 1, components of BSE 100A include an alert engine 106, a blockchain module 108, a BGP listener 110, a route validator 112, and an AI threat detection engine 114.

Blockchain module 108 obtains network address prefix ownership information stored by one or more blocks of the blockchain of consensus network 122. In some examples, each BSE 100 participates in the blockchain, and blockchain module 108 runs a node 124 of the blockchain and stores the blockchain locally at BSE 100A. In other examples, blockchain module 108 does not participate in the blockchain, but obtains IP ownership information from a separate device that runs a peer node 124 of the blockchain. In some examples, blockchain module 108 decrypts the encrypted network address prefix ownership information. Blockchain module 108 provides the network address prefix ownership information to route validator 112 for use in validating BGP routes.

Each of autonomous systems 116 includes a plurality of routers, including routers 118A-118C ("routers 118"). Although for ease of illustration only one of routers 118 is shown for each of autonomous systems 116 in the example of FIG. 1, each autonomous system 116 is made up of a corresponding plurality of routers that communicate with each other and potentially with other routers in other autonomous systems 116 to exchange routing information. Routers on a border of autonomous systems are referred to as border routers, and communicate using an exterior routing protocol such as exterior Border Gateway Protocol (eBGP). Routers 118 are border routers. Routers 118 also communicate with other routers within the same autonomous system 116 using an interior routing protocol such as interior BGP (iBGP). Autonomous systems 116 may also include one or more non-border routers (not shown). Although system 101 is shown for purposes of example having three autonomous systems 116, in other examples the techniques of this disclosure may be applied to systems having any number of autonomous systems.

BGP listener 110 establishes an eBGP peering session with router 118A of the autonomous system 116A with which BSE 100A is associated. Routers participating in a BGP peering session may be called "BGP speakers" or "peer routers." BGP listener 110A receives one or more route advertisements (e.g., BGP update messages) 126A from router 118A, which communicates all routes stored in routing information of router 118A through a BGP session between BGP listener 110 and BSE 100A. BGP listener 110A is a passive listener, which means that BGP listener 110A does not advertise any routes to peer routers, and does not route any traffic using its stored routes.

In this example, BSE 100A establishes an eBGP peering session with router 118A and receives BGP update route advertisements. BSE 100A does not alter or modify routing information stored on router 118A. In this manner, the techniques of this disclosure do not require modifying the existing hardware and/or routers 118 in autonomous systems 116. BSEs 100 provide a non-intrusive way to enhance BGP security without affecting current operations of BGP routers 118. In some examples, BSEs 100 may be implemented as a virtualized network service. In some examples, BSE 100 can be run as one or more containers or as one or more applications within virtual machines, or on bare-metal servers.

After BSE 100A receives the advertised route information through passive listening by the BGP listener 110, route validator 112 checks against the locally stored network address prefix ownership information obtained by blockchain module 108 to determine whether any route learned from router 118A contains a mismatched autonomous system and route prefix. For example, route validator 112 may look up in the locally stored ledger, using as a key the AS identifier of the originating BGP speaker's autonomous system. The AS identifier is specified in a field of the BGP route advertisement. For example, when a BGP speaker originates a route, the originating speaker includes its own AS number in a path segment in the AS PATH attribute of all UPDATE messages sent to an external peer (i.e., a peer positioned in a different AS than the originating speaker. More details regarding BGP can be found in Y. Rekhter, et. al, "A Border Gateway Protocol 4 (BGP-4)," IETF Network Working Group RFC 4271, January 2006, the entire contents of which are incorporated by reference. For instance, if route validator 112 of BSE 100A determines the AS identifier for the AS, indicated in a route advertisement as originating a route for a network address prefix, does not match the AS identifier for the AS indicated in the network address prefix ownership information as owning the network address prefix, route validator 112 has identified a mismatch for the network address prefix.

If route validator 112 identifies a mismatch of autonomous system and prefix information, route validator 112 will take one or more actions, e.g., according to policies. For example, route validator 112 may flag that routing information as a potential threat and trigger alert engine 106 to send an alert, e.g., to a network operator or administrator 120A. In some examples, the route validator 112 invokes a configuration interface, e.g., a CLI, or a management protocol, e.g., Simple Network Management Protocol (SNMP), to direct router 118A to automatically delete or correct the erroneous routing information. In some examples, BSE 100A communicates with a network controller (not shown) which configures router 118A to delete or correct the erroneous routing information.

Route validator 112 may further use artificial intelligence (AI) threat detection engine 114 to enhance security by learning from previous BGP routes. AI threat detection engine 114 collects previous BGP routes, analyzes them, and detects route refresh and/or change patterns, and then feeds these patterns to the route validator 112 to flag potential threats and send alerts about the threats via the alert engine 106. In some examples, AI threat detection may use neural networks or other machine learning/AI technology to detect route patterns that may represent threats. In one example of AI threat detection engine 114 detecting patterns, AI threat detection engine 114 stores a baseline for BGP routes with respect to the BGP next hop router, and if AI threat detection engine 114 detects routes with an unknown next hop, flags the route as potentially harmful. For example, a route with an unknown next hop might be considered an anomaly, which sometimes indicates a BGP route have been hijacked. For example, AI threat detection engine 114 may detect a pattern indicating a honeypot approach may be being used by a malicious actor. In some examples, AI threat detection engine 114 sending the threat information serves as a trigger for blockchain module 108 to pull information from consensus network 122 and compare to route information.

Examples of information that AI threat detection engine 114 can collect include AS prefix ownership information, and BGP update messages (including both advertisement and withdrawal messages) with timestamp information included. Based on the BGP update messages, AI threat detection engines 114 can derive at least one or more of the following, for example: Number of announcements (unique vs. duplicates), Number of route withdrawals (unique vs. duplicates), Average, Min and Max AS-PATH length, Inter-arrival time of route advertisements, Packet size, Number of edits between, and Number of IBGP, EBGP packets. Then AI threat detection engine 114 can use the collected/derived information to determine baseline routes with respect to their origin AS, BGP next hop router, neighboring AS, the border router, etc., so that AI threat detection engine 114 can differentiate normal BGP behaviors from abnormal ones. If AI threat detection engine 114 detects abnormal patterns, AI threat detection engine 114 flag the route as a potential threat. For example, a route or prefix X has always been advertised by neighbor A but now it is being announced by neighbor B, then this indicates X is potentially being hijacked.

AI threat detection engine 114 may train a machine learning model, or may receive a trained machine learning model, that provides predicted outputs in response to patterns of advertised routes received by BSEs 100. AI threat detection engine 114 applying the machine learning model may in this way detect patterns as described above. AI threat detection engine 114 may represent a distributed application that shares information across instances of AI threat detection engine 114 of BSEs 100 to train a machine learning model for the distributed application.

Training of the machine learning model may be supervised or unsupervised. In some instances, the machine learning model is trained through a combination of labeled and unlabeled training data, a combination of supervised/unsupervised training, or combinations thereof. Examples of machine learning include naïve Bayes, nearest neighbor, decision trees, neural networks, linear regression, support vector machines, k-Means clustering, Q-learning, temporal difference, deep adversarial networks, or other supervised, semi-supervised, unsupervised, or reinforcement learning algorithms to train one or more machine learning models for identifying invalid route updates, as described above.

In some examples, the machine learning model may be trained according to transfer learning. For example, AI threat detection engine 114 may train a machine learning base model based on data collected from multiple different BSEs 100 associated with different autonomous systems, and then a given AI threat detection engine instance can use the machine learning base model as a starting point, and further tune the machine learning base model based on data collected by the given AI threat detection engine.

Route validator 112 leverages prefix ownership information stored by blockchain module 108 and threat patterns learned from AI threat detection engine 114 to detect malicious and/or illegitimate BGP routes in the routing information received from routers 118 in the autonomous systems 116, and in response may generate alerts that notify network operator (e.g., administrator) 120A. In some examples, AI threat detection engine 114 associated with autonomous system 116A may send and/or receive threat information to/from other BSEs associated with other autonomous systems 116 (e.g., autonomous system 116B, 116C).

Because network address prefix ownership information is mostly static and/or rarely changes, distributed ledger technology, e.g., blockchain, can be useful to ensure traceability and immutability of the information without causing network performance concerns. If there is a change to existing prefix ownership information, a new block is created and added to the blockchain maintained by nodes 124. In this manner, BSEs 100 can track of the ownership of all the prefixes and subsequent changes in an immutable and decentralized way.

By leveraging installed entities in the network, each BSE 100 can examine routes from different routers to build a more robust threat detection engine. Sharing prefix information across all routers and autonomous systems in this regard helps enhance security in all autonomous systems. BSEs 100 are consultative rather than integrated into individual routers and/or autonomous systems. As more systems join the network, the network becomes stronger and more robust since the BSEs 100 are functioning outside the routers and collecting information from all autonomous systems in the network. This setup increases visibility across the network so that different routers in different autonomous systems can determine what router information is valid in other routers, from the router perspective. In this manner, the techniques of this disclosure offer a collaborative approach to identifying threats rather than a single router view. In some example, the techniques of this disclosure may be used in the context of co-location and interconnection providers that serve as hubs for Internet services and establish Internet peering points for service providers.

Figure 2:
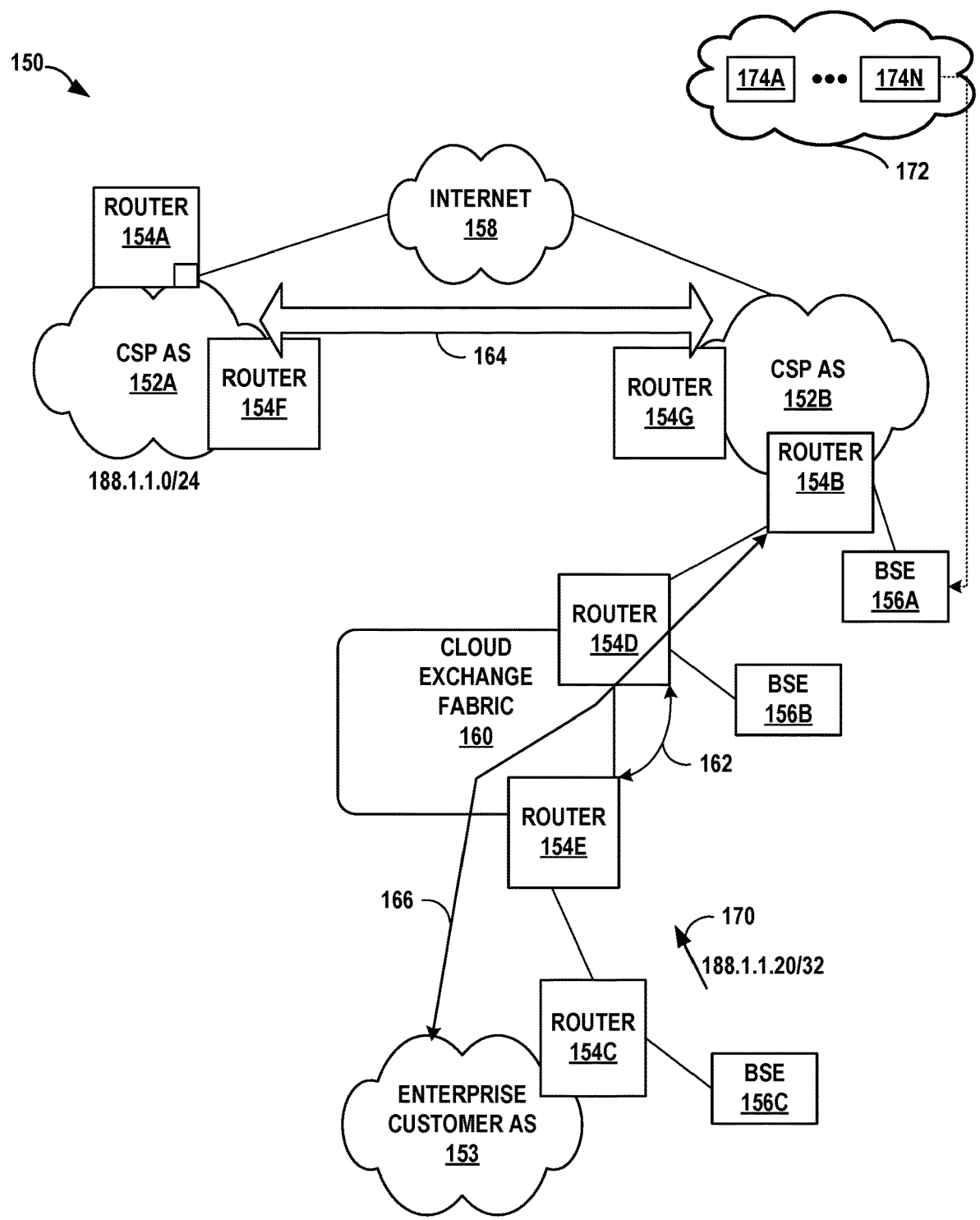
FIG. 2 is a block diagram illustrating an example system having multiple autonomous systems including a cloud exchange fabric, in accordance with example aspects of the techniques of this disclosure.

FIG. 2 is a block diagram illustrating an example system 150 having multiple autonomous systems including a cloud exchange fabric 160, in accordance with example aspects of the techniques of this disclosure. In some examples, cloud exchange fabric 160 may be a Multiprotocol Label Switching (MPLS) network. Routers 154A-154E (routers 154) may establish BGP peering sessions between each other and exchange BGP routes, advertising IP prefixes that are reachable via themselves.

In general, an interconnection platform provides customers of the exchange, e.g., enterprises, network carriers, and SaaS customers, with secure, private, virtual connections to multiple cloud service providers (CSPs) globally. The multiple CSPs participate in the cloud exchange by virtue of their having at least one accessible port in the cloud exchange by which a customer can connect to the one or more cloud services offered by the CSPs, respectively. A cloud exchange allows private networks of any customer to be directly cross-connected to any other customer at a common point, thereby allowing direct exchange of network traffic between the networks of the customers. Customers may include network carriers (or network service providers), enterprises, and other users of cloud services offered by one or more cloud service providers.

A cloud-based services exchange, or "cloud exchange" may be configured and managed to facilitate virtual connections for cloud services delivery from multiple cloud service providers to one or more cloud customers. The cloud exchange may enable cloud customers to bypass the public Internet 158 to directly connect to cloud services providers to improve performance, reduce costs, increase the security and privacy of the connections, and leverage cloud computing for additional applications. In this way, enterprises, network carriers, and SaaS customers, for instance, can integrate cloud services with their internal applications as if such services are part of or otherwise directly coupled to their own data center network. Examples of cloud-based services exchanges are described in U.S. Pat. No. 9,948,552, issued Apr. 17, 2018 and entitled "CLOUD-BASED SERVICES EXCHANGE;" and in U.S. Pat. No. 9,886,267, issued Feb. 6, 2018, and entitled "INTERCONNECTION PLATFORM FOR REAL-TIME CONFIGURATION AND MANAGEMENT OF A CLOUD-BASED SERVICES EXCHANGE;" the entire contents of each of which being incorporated by reference herein.

In some examples, cloud exchange fabric 160 may be part of a cloud-based services exchange that includes interconnection assets configured to connect a customer of the cloud-based services exchange to one or more cloud service providers such as CSP associated with CSP AS 152B, the plurality of interconnection assets including a virtual circuit by which the customer (e.g., an enterprise customer associated with enterprise customer AS 153) accesses a cloud service from CSP AS 152B. Cloud exchange fabric 160 may also include an orchestration engine (not shown) configured to modify the interconnection assets.

In some examples, an interconnection platform for cloud exchange fabric 160 exposes a collection of software interfaces, e.g., application programming interfaces (APIs), that allow access to capabilities and assets of the interconnection platform in a programmable fashion. As such, the software interfaces provide an extensible framework that allows software developers associated with customers and partners of the exchange to build software applications that access the interconnection platform that automatically manage interconnection with multiple cloud service providers participating in the interconnection platform. In other words, developers from network services providers, cloud service providers, managed service providers and other enterprises may use the software interfaces exposed by the interconnection platform and defined by the APIs to build custom applications and frameworks for seamless interaction with the interconnection platform to facilitate the delivery of cloud services from cloud service providers to cloud service customers. These software interfaces defined by the APIs enable machine-to-machine communication for near real-time setup and modifications of interconnections, and may also eliminate or reduce the need for human interaction for the entire interconnection setup and management process. In this way, the software interfaces provide an automated and seamless way to establish, un-install, and manage interconnection with multiple cloud providers participating in an interconnection platform.

In accordance with the techniques of this disclosure, BSEs 156A-156C (BSEs 156) operate to obtain network address prefix ownership information from a blockchain/distributed ledger maintained by nodes 174 of consensus network 172. BSEs 156 also establish eBGP peering sessions with routers of the autonomous system with which the corresponding BSE 156 is associated. BSEs 156 receive route advertisements (e.g., BGP update messages) from routers 154, which communicates routes stored in routing information through a BGP session between the router and the BSE 156. BSEs 156 are passive listeners on the BGP sessions.

FIG. 2 illustrates one example in which runtime authorization of BGP Prefixes ownership can identify improper behavior which can be an attack into BGP vulnerabilities and could result in service disruption. In the absence of the techniques of this disclosure, any prefixes and routing information being maliciously modified gets installed into the RIB tables, and traffic can be routed toward the wrong destinations. The incorrectly routed traffic may either be dropped after a redirection (blackholing) or may be eavesdropped by routing the traffic through an attacker's traffic analysis system. Sometimes, route mistakes can also be made by network engineers who are managing the routing infrastructure.

As shown in FIG. 2, network traffic 164 flows bidirectionally between CSP AS 152A and CSP AS 152B as they establish one or more BGP sessions among themselves to exchange routes and consume services from each other. Assume that CSP AS 152A has an AS identifier of AS number 200). As part of the BGP peering session, CSP AS 152A's BGP router 154F advertises its route 188.1.1.0/24 nexthop IP-A AS_PATH 200 to CSP AS 152B's BGP router 154G, and this route gets installed into BGP router 154G's routing table.

CSP AS 152B is hosted on cloud exchange fabric 160 platform as a CSP. For enterprise customer AS 153 (having, e.g., AS number is 100) in FIG. 2, a link 166 is established between router 154A of CSP AS 152B and cloud exchange fabric routers 154D, 154E to allow routing traffic from enterprise customer AS 153. As part of this connectivity, router 154C of enterprise customer AS 153 will establish a BGP session with the router 154B of CSP AS 152B. Link 116 may be formed, in part, over a layer three virtual private network (L3 VPN) 162 through cloud exchange fabric 160.

Assume that by mistake router 154C sends a route advertisement 170 specifying a route 188.1.1.20/32 nexthop IP-C AS_PATH 100 to the CSP AS 152B BGP router 154B. However, the prefix 188.1.1.20/32 does not belong to the operator of enterprise customer AS 153, but rather belongs to the operator of CSP AS 152A who bought this public block from IRR (188.1.1.0/24). Router 154B's routing table stores the following routes: 188.1.1.20/32 nexthop intf 3/IP-A AS Path 100; 188.1.1.0/24 nexthop intf 1/IP-C AS Path 200. Because the route 188.1.1.20/32 is learned through cloud exchange fabric 160 and assuming CSP AS 152B has policies that prefer routes learned via link 166, CSP AS 152B BGP router 154B therefore installs this incorrect route 188.1.1.20/32 nexthop IP-C AS_PATH 100 with a higher local preference, which is preferred. As a result, absent the techniques described in this disclosure for validating routes prior to installation, traffic destined for 188.1.1.20/32, which should be routed to CSP AS 152A, would get routed to enterprise customer AS 153 based on the routing table lookup.

In accordance with the techniques of this disclosure, BSE 156A checks the routing information stored in the routing table against the prefix ownership information obtained from the blockchain, for any mismatched AS and prefix information. In some examples, BSE 156A also considers threat patterns learned from based on analysis of previous routes, including threat patterns identified and received from one or more of BSEs 156B, 156C. BSE 156A determines that the AS and prefix information are mismatched for 188.1.1.20/32 nexthop intf 3/IP-A AS Path 100, because the prefix ownership information obtained from the blockchain of consensus network 172 indicates that the prefix 1.88.1.1.20/32 corresponds to AS Path 200 and not AS path 100. In response to determining this, BSE 156A flags the associated route as a potential threat and may generate an alert, e.g., to administrator of CSP AS 152B and/or an administrator of enterprise customer AS 153, enabling the autonomous systems to correct the incorrect routing information.

In this manner, the fact that network traffic is being routed to the wrong destination can be flagged quickly and automatically, so that appropriate action may be taken by network administrators, such as deleting or correcting the erroneous routing information. In some examples, the BSE 156A invokes a configuration interface, e.g., a CLI, or a management protocol, e.g., Simple Network Management Protocol (SNMP), to direct router 154B to automatically delete or correct the erroneous routing information. In some examples, BSE 156A communicates with a network controller (not shown) which configures router 154B to delete or correct the erroneous routing information. The techniques of this disclosure may provide significantly increased security of BGP routing information, e.g., as compared to simple username and password protection of a BGP peering session, especially given that the username and password are typically stored as clear text on BGP routers and may not be frequently refreshed/updated.

In some examples, a provider of cloud exchange fabric 160 may provide BGP route verification as a service to customers of the cloud exchange fabric 160, such as NSPs, CSPs, enterprises, such as via a subscription service.

Figure 3:
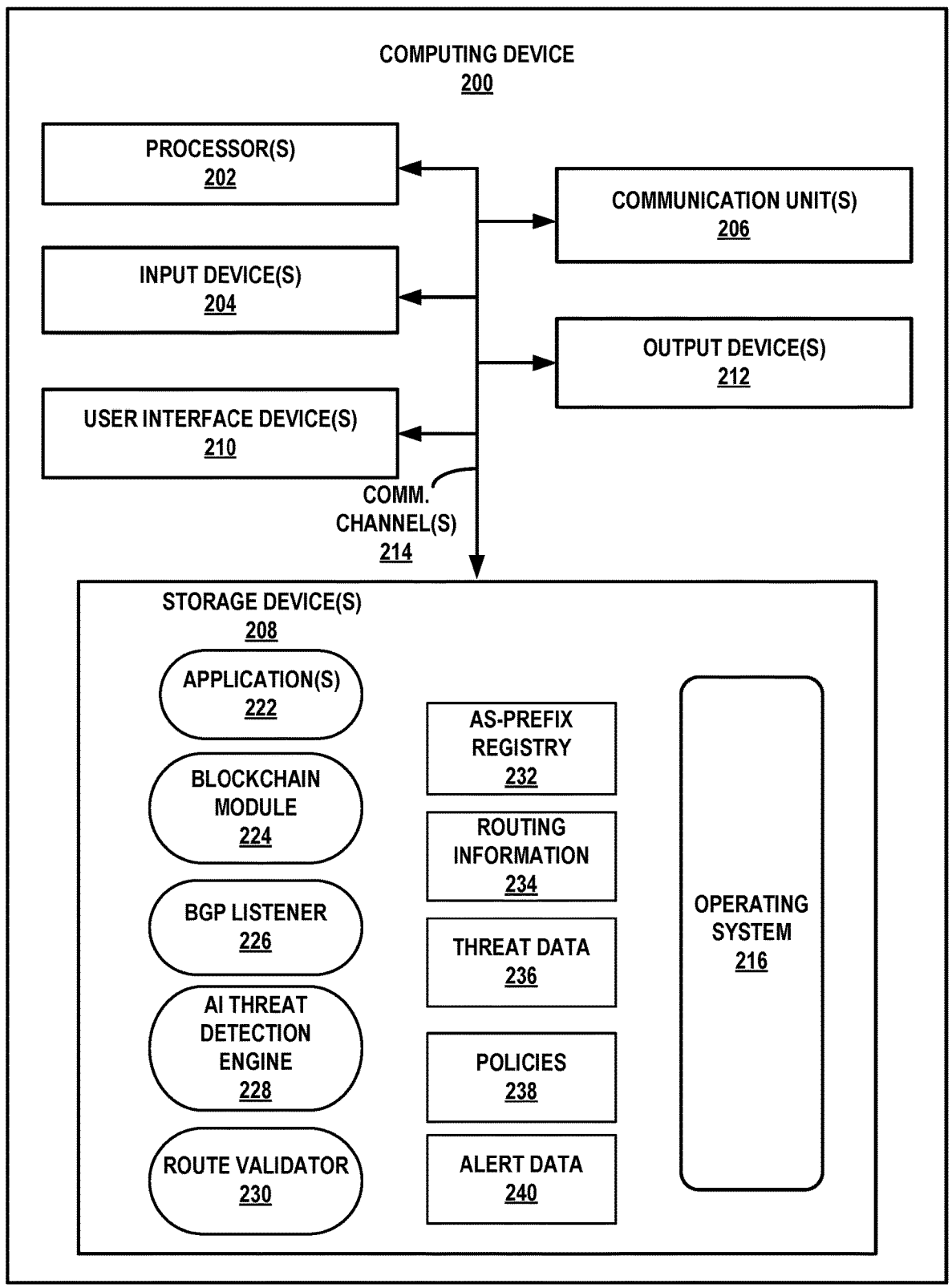
FIG. 3 is a block diagram illustrating an example computing device that operates in accordance with one or more techniques of this disclosure.

FIG. 3 is a block diagram illustrating an example computing device 200 that operates in accordance with one or more techniques of this disclosure. FIG. 3 computing device 200 may be, for example, any of BSEs 100A-100C. For example, blockchain module 224 corresponds to blockchain 108A, BGP listener 226 corresponds to BGP listener 110A, AI threat detection engine 228 corresponds to AI threat detection engine 114A, and router validator 230 corresponds to route validator 112A and alert engine 106A. FIG. 3 illustrates a particular example of a server or other computing device 200 that includes one or more processor(s) 202 for executing any one or more of blockchain module 224, BGP listener 226, AI threat detection engine 228, route validator 230, or any other computing device described herein. Other examples of computing device 200 may be used in other instances.

Although shown in FIG. 3 as a stand-alone computing device 200 for purposes of example, a computing device that operates in accordance with the techniques of this disclosure may be any component or system that includes one or more processors or other suitable computing environment for executing software instructions and, for example, need not necessarily include one or more elements shown in FIG. 3 (e.g., communication units 206; and in some examples, components such as storage device(s) 208 may not be co-located or in the same chassis as other components). In some examples, BSEs 100 may be implemented as a virtualized network service. In some examples, BSE 100 can be run as one or more containers or as one or more applications within virtual machines, or on bare-metal servers. As shown in the example of FIG. 3, computing device 200 includes one or more processors 202, one or more input devices 204, one or more communication units 206, one or more output devices 212, one or more storage devices 208, and one or more user interface (UI) device(s) 210. Computing device 200, in one example, further includes one or more application(s) 222 and operating system 216 that are executable by computing device 200. Each of components 202, 204, 206, 208, 210, and 212 are coupled (physically, communicatively, and/or operatively) for inter-component communications. In some examples, communication channels 214 may include a system bus, a network connection, an inter-process communication data structure, or any other method for communicating data. As one example, components 202, 204, 206, 208, 210, and 212 may be coupled by one or more communication channels 214.

Processors 202, in one example, are configured to implement functionality and/or process instructions for execution within computing device 200. For example, processors 202 may be capable of processing instructions stored in storage device 208. Examples of processors 202 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 208 may be configured to store information within computing device 200 during operation. Storage device 208, in some examples, is described as a computer-readable storage medium. In some examples, storage device 208 is a temporary memory, meaning that a primary purpose of storage device 208 is not long-term storage. Storage device 208, in some examples, is described as a volatile memory, meaning that storage device 208 does not maintain stored contents when the computer is turned off. Examples of volatile memories include random access memories (RAM), dynamic random access memories (DRAM), static random access memories (SRAM), and other forms of volatile memories. In some examples, storage device 208 is used to store program instructions for execution by processors 202. Storage device 208, in one example, is used by software or applications running on computing device 200 to temporarily store information during program execution.

Storage devices 208, in some examples, also include one or more computer-readable storage media. Storage devices 208 may be configured to store larger amounts of information than volatile memory. Storage devices 208 may further be configured for long-term storage of information. In some examples, storage devices 208 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 200, in some examples, also includes one or more communication units 206. Computing device 200, in one example, utilizes communication units 206 to communicate with external devices via one or more networks, such as one or more wired/wireless/mobile networks. Communication units 206 may include a network interface card, such as an Ethernet card, an optical transceiver, a radio frequency transceiver, or any other type of device that can send and receive information. Other examples of such network interfaces may include 3G and WiFi radios. In some examples, computing device 200 uses communication unit 206 to communicate with an external device.

Computing device 200, in one example, also includes one or more user interface devices 210. User interface devices 210, in some examples, are configured to receive input from a user through tactile, audio, or video feedback. Examples of user interface devices(s) 210 include a presence-sensitive display, a mouse, a keyboard, a voice responsive system, video camera, microphone or any other type of device for detecting a command from a user. In some examples, a presence-sensitive display includes a touch-sensitive screen. In some examples, a user such as an employee of the co-location facility provider may enter configuration data defining metrics for characterizing services.

One or more output devices 212 may also be included in computing device 200. Output device 212, in some examples, is configured to provide output to a user using tactile, audio, or video stimuli. Output device 212, in one example, includes a presence-sensitive display, a sound card, a video graphics adapter card, or any other type of device for converting a signal into an appropriate form understandable to humans or machines. Additional examples of output device 212 include a speaker, a cathode ray tube (CRT) monitor, a liquid crystal display (LCD), or any other type of device that can generate intelligible output to a user.

Computing device 200 may include operating system 216. Operating system 216, in some examples, controls the operation of components of computing device 200. For example, operating system 216, in one example, facilitates the communication of one or more applications 222 with processors 202, communication unit 206, storage device 208, input device 204, user interface devices 210, and output device 212. Applications 222 may also include program instructions and/or data that are executable by computing device 200.

BGP listener 226 stores route information received from one or more peering BGP routers (e.g., router 118A) that are monitored by the enhanced BGP security service. For example, BGP listener 226 establishes a BGP peering session with router 118A and receives route advertisements that specify one or more IP prefixes, and AS identifier of the originating AS for the IP prefixes. In some examples, BGP listener 226 stores route information in routing information 234 data structure.

In some examples, blockchain module 224 stores encrypted or decrypted prefix ownership information in the AS-Prefix Registry 232. In some examples, AS-prefix registry 232 is a data structure storing information mapping network address prefixes (e.g., IP prefixes) to autonomous system identifiers (e.g., AS numbers). As discussed in the example of FIG. 1, trustees may be authorized to publish the prefix ownership information onto a blockchain so that no random user or application inserts erroneous information into the blockchain.

In some examples, such as where computing device 200 operates as a node on the blockchain, blockchain module 224 performs functions relating to adhering protocols and/or procedures of a consensus network. Blockchain module 224 may cause communication unit(s) 206 to communicate with one or more computing devices within consensus network 122 according to a consensus algorithm or blockchain protocol to cause other the computing device to update a distributed ledger maintained by the computing devices within consensus network 122. For example, blockchain module 224 may update its own AS-Prefix Registry 232, and verify that AS-Prefix Registry 232 is consistent with other AS-Prefix Registry 232 included across all autonomous systems 116. Blockchain module 224 may follow a consensus protocol to verify the validity of the instructions to modify AS-Prefix Registry 232 and blockchain module 224 may implement one or more blockchain services of a distributed computing platform. Blockchain module 224 may decrypt encrypted prefix ownership information.

In other examples, blockchain module 224 does not participate in the blockchain, but obtains prefix ownership information from a separate device that runs a peer node 124 of the blockchain. In some examples, blockchain module 224 decrypts the encrypted network address prefix ownership information. In other examples, the network address prefix ownership information is not encrypted when blockchain module 224 receives it, e.g., because the separate peer node has decrypted the network address prefix ownership information prior to sending to blockchain module 224. Blockchain module 224 provides the network address prefix ownership information to route validator 230 for use in validating BGP routes. For example, blockchain module 224 may store network address prefix ownership information (e.g., in decrypted form) to AS-prefix registry 232, which is accessible by route validator 230.

In some examples, blockchain module 224 receives the network address prefix ownership information from a distributed ledger (e.g., stored internal to computing device 200 or from a device external to computing device 200) and compares this to received routing information in response to receiving the plurality of routing protocol routes. For example, in response to BGP listener 226 receiving a BGP update message from a BGP peer router may trigger route validator 230 to obtain prefix ownership information for one or more route prefixes to compare against the routing information contained in the BGP update message. In some examples, receiving the BGP update message may cause route validator 230 to obtain the prefix ownership information that was previously stored in AS-prefix registry 232, or to obtain the prefix ownership information from an external blockchain. Alternatively or additionally, blockchain module 224 may receive the network address prefix ownership information from a distributed ledger compare to received routing information periodically, e.g., according to a configurable time period.

Route validator 230 compares the association between a route prefix and an autonomous system identifier to the association specified by the prefix ownership information to determine whether any of the received routes contains a mismatched route prefix—AS identifier association. In response to detecting a mismatch, route validator (or a separate alert module, not shown) generates alerts indicating a mismatched route to AS identifier has been identified. For example, when the route validator 230 determines there is a mismatch of information, that information is flagged as a potential threat and may be stored in alert data 240 data structure. The route validator 230 accesses policies 238 data structure, which contains rules about how to manage alerts. The route validator 230 can then send out an alert via the alert engine 106A according to the rules stored in policies 238. The policies 238 may contain rules specifying actions to be performed when there is a mismatch, actions to be performed there is no mismatch, how to flag potential threats, and where and when to send alerts about mismatched information, for example. In some examples, route validator 230 may send and/or receive information about mismatched route prefixes to other BGP security engines associated with different autonomous systems, and may send alerts based on information received from other BGP security engines.

In some examples, AI threat detection engine 228 learns from data stored in routing information 234 over time to detect patterns in route refreshing and/or changing. Information determined based on the detected patterns is stored in threat data 236 data structure. In some examples, route validator 230 compares and/or correlates information stored in AS-Prefix Registry 232 data structure with the threat patterns learned from the AI threat detection engine 228 that is stored in threat data 236 to detect malicious and/or illegitimate BGP routes. Based on analyzing this information, the route validator 230 generates alerts, e.g., to notify the network operator or administrator 120A. In some examples, AI threat detection engine 228 may send and/or receive information about threat pattern data to other BGP security engines associated with different autonomous systems, and may use information received from other BGP security engines in detecting threats in the local autonomous system.

In some examples, blockchain module 224 receives the network address prefix ownership information from the distributed ledger in response to receiving the threat pattern data. In some examples, AI threat detection engine 228 receiving the threat pattern data may cause route validator 230 to obtain the prefix ownership information that was previously stored in AS-prefix registry 232, or to obtain the prefix ownership information from an external blockchain.

Figure 4:
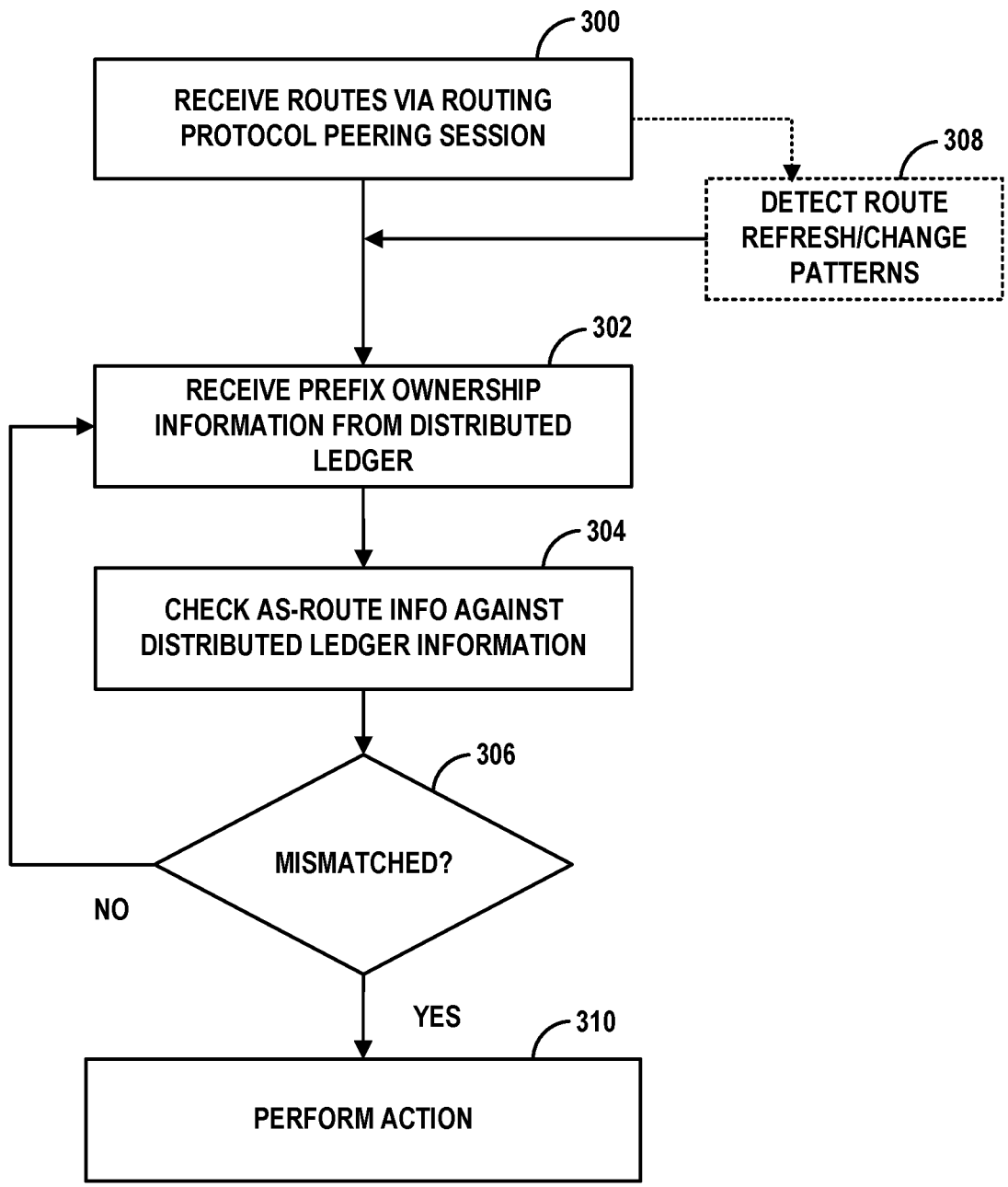
FIG. 4 is a flowchart illustrating example operation of a network device in accordance with aspects of the techniques of this disclosure.

FIG. 4 is a flowchart illustrating example operation of a network device in accordance with aspects of the techniques of this disclosure. For example, the operation may be performed by a network device such as BSE 100A, or computing device 200 of FIGS. 1 and 2. For purposes of example, FIG. 4 is explained from the perspective of BSE 100A and with reference to computing device 200.

In the example of FIG. 4, the BGP listener 226 establishes an eBGP peering session with BGP router 118A of AS 116A to which the BGP listener 110 is assigned. BGP listener 226 receives routes from the peering router 118A via the BGP session (300). BGP listener 226 may store the routes to routing information 234. BGP listener 226 does not advertise any routes to the peering BGP router 118A. BSE 100A also receives prefix ownership information from a distributed ledger (302). In one example, BSE 100A is a participating node of the distributed ledger, and stores a copy of the ledger including associations between network address prefixes and autonomous system identifiers. In another example, blockchain module 224 may obtain the network address prefix ownership information from a participating node 124 of the distributed ledger (that is distinct from BSE 100A). Blockchain module 224 may store the network address prefix ownership information to AS-prefix registry 232, for example.

In some examples, AI threat detection engine 228 analyzes previous BGP routes and to detect patterns in route refreshing and/or changing (308). If patterns are detected, AI threat detection engine 228 stores information about the patterns to threat data 236, which may be used by route validator 230 as part of determining whether to send alerts, e.g., according to policies 238. In some examples, AI threat detection engine 228 sends threat pattern information to one or more different BSEs 100 associated with different autonomous system(s) than that to which computing device 200 is assigned. In some examples, AI threat detection engine 228 alternatively or additionally receives threat pattern information from one or more different BSEs 100 associated with different autonomous system(s) than that to which computing device 200 is assigned, and may store the information to threat data 236.

Different types of protocols and implementation methods can be applied here to facilitate the message exchange between BSEs and AI threat detection engine 228. For instance, in some examples a Kafka based publication/subscribe message queue can be leveraged and a common topic is created for AI threat detection engine 228 and BSEs to subscribe and publish information. When a new pattern is detected, AI threat detection engine can publish the pattern information on the Kafka queue. Since BSEs subscribe to the same queue, they would be notified automatically. In another example, the system may leverage the APIs provided by BSEs to push data to them. In both examples, JSON format may be used to format the pattern information. AI threat detection engine 228 may run the analysis against its received route update information in near real-time fashion and notify the BSEs as soon as it detects a new anomaly/threat.

Route validator 230 checks against the prefix ownership information, such as in AS-Prefix Registry 232, for any mismatched AS and prefix information (304). In some examples, route validator 230 also considers threat patterns learned from the AI threat detection engine 228 (e.g., stored in threat data 236). If the AS and prefix information are mismatched (YES branch of 306), then route validator 230 performs an action (310). For example, route validator 230 may perform an action such as flagging the associated route as a potential threat, causing alert engine 106 to generate and send an alert, e.g., to administrator 120A of the corresponding AS 116A, and/or configuring a router (e.g., router 118A) to remove the route from its stored routing information. Alert data may be stored in alert data 240. In some examples, alert engine 106 may determine what actions to take in response to identifying mismatched prefix ownership information based on policies 238, for example, which may be configurable. In some examples, in response to determining that a route in routing information 234 specifies an autonomous system identifier different than is specified by AS-prefix registry 232 obtained by blockchain module 224, route validator 230 sends an indication to a different BSE 100 associated with a different autonomous system than that to which computing device 200 is assigned. If there is no mismatch of AS and prefix information (NO branch of 306), then the process continues by evaluating subsequently received routes.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
   receiving, by a first network device via a routing protocol peering session with a peer router in a first autonomous system, a plurality of routing protocol routes to destination addresses, each routing protocol route of the plurality of routing protocol routes specifying a network address prefix and an identifier of the autonomous system that originated the routing protocol route;
   receiving, by the first network device, network address prefix ownership information from a distributed ledger storing a plurality of associations between respective network address prefixes and respective autonomous system identifiers of autonomous systems confirmed to own the respective network address prefixes;
   receiving, by the first network device from a second network device associated with a second autonomous system, threat pattern data indicating patterns in routing protocol route changes in the second autonomous system;
   determining, by the first network device and based at least on the network address prefix ownership information and the threat pattern data, whether any of the plurality of routing protocol routes specifies an autonomous system identifier different than specified by the plurality of associations; and
   in response to determining that a route of the plurality of routing protocol routes specifies an autonomous system identifier different than specified by the plurality of associations, performing, by the first network device, an action.

2. The method of claim 1, wherein the first network device comprises a participating node of the distributed ledger, the method further comprising:
   storing, by the first network device, a copy of the plurality of associations between the respective network address prefixes and the autonomous system identifiers, and wherein receiving the network address prefix ownership information comprises obtaining the network address prefix ownership information from the stored copy.

3. The method of claim 1, wherein receiving the network address prefix ownership information comprises obtaining the network address prefix ownership information from a participating node of the distributed ledger, the participating node being distinct from the first network device.

4. The method of claim 1, further comprising:
in response to determining that a route of the plurality of routes specifies an autonomous system identifier different than specified by the plurality of associations, sending an indication of the determination to the second autonomous system.

5. The method of claim 1, wherein receiving the network address prefix ownership information from the distributed ledger comprises obtaining the network address prefix ownership information in response to receiving the plurality of routing protocol routes.

6. The method of claim 1, wherein receiving the network address prefix ownership information from the distributed ledger comprises obtaining the network address prefix ownership information in response to receiving the threat pattern data.

7. The method of claim 1, wherein receiving the network address prefix ownership information from the distributed ledger comprises periodically receiving the network address prefix ownership information according to a configurable time period.

8. The method of claim 1, wherein the distributed ledger stores the plurality of associations between respective network address prefixes and autonomous system identifiers in encrypted form, the method further comprising:
decrypting, by the first network device, the network address prefix ownership information.

9. The method of claim 1, wherein the threat pattern data is first threat pattern data, the method further comprising:
generating, by the first network device, second threat pattern data based on the plurality of routing protocol routes received via the routing protocol session with the peer router in the first autonomous system; and
sending, by the first network device, the second threat pattern data to the second network device associated with the second autonomous system.

10. The method of claim 1, wherein performing an action comprises outputting an alert.

11. The method of claim 1, wherein performing an action comprises configuring the peer router to remove the route.

12. The method of claim 1, wherein the routing protocol peering session comprises a Border Gateway Protocol peering session, and wherein receiving the plurality of routing protocol routes comprises receiving one or more BGP update messages.

13. The method of claim 1, wherein the distributed ledger comprises a blockchain.

14. A system comprising
a plurality of autonomous systems, each comprising a corresponding plurality of routers exchanging routing information via routing protocol advertisements;
a distributed ledger storing a plurality of associations between respective network address prefixes and autonomous system identifiers of the autonomous systems of the plurality of autonomous systems that are confirmed to own the associated network address prefixes;
a plurality of routing protocol security engines, each associated with a corresponding one of the plurality of autonomous systems, wherein each of the plurality of routing protocol security engines comprises:
processing circuitry operable to:
receive, via a routing protocol peering session with a peer router in a particular autonomous system of the plurality of autonomous systems, a plurality of routing protocol routes to destination addresses, each routing protocol route of the plurality of routing protocol routes specifying a network address prefix and an identifier of the autonomous system that originated the routing protocol route;
receive network address prefix ownership information from a distributed ledger storing a plurality of associations between respective network address prefixes and respective autonomous system identifiers of autonomous systems confirmed to own the respective network address prefixes;
receive from a different one of the plurality of routing protocol security engines associated with a second autonomous system of the plurality of autonomous systems, threat pattern data indicating patterns in routing protocol route changes in the second autonomous system;
determine based at least on the network address prefix ownership information and the threat pattern data, whether any of the plurality of routing protocol routes specifies an autonomous system identifier different than specified by the plurality of associations; and
in response to determining that a route of the plurality of routing protocol routes specifies an autonomous system identifier different than specified by the plurality of associations, performing an action.

15. The system of claim 14, wherein each of the plurality of routing protocol security engines comprises a participating node of the distributed ledger, the processing circuitry further operable to store a copy of the plurality of associations between the respective network address prefixes and the autonomous system identifiers, and wherein the processing circuitry operable to receive the network address prefix ownership information comprises processing circuitry operable to obtain the network address prefix ownership information from the stored copy.

16. The system of claim 14, wherein the processing circuitry operable to receive the network address prefix ownership information comprises processing circuitry operable to obtain the network address prefix ownership information from a participating node of the distributed ledger, the participating node being distinct from the first network device.

17. The system of claim 14, the processing circuitry further operable to:
in response to determining that a route of the plurality of routes specifies an autonomous system identifier different than specified by the plurality of associations, send an indication of the determination to the second autonomous system.

18. The system of claim 14, wherein the processing circuitry operable to receive the network address prefix ownership information comprises processing circuitry operable to obtain the network address prefix ownership information in response to receiving the plurality of routing protocol routes.

19. The system of claim 14, wherein the processing circuitry operable to receive the network address prefix ownership information comprises processing circuitry operable to obtain the network address prefix ownership information in response to receiving the threat pattern data.

20. A non-transitory computer-readable storage medium encoded with instructions for causing one or more programmable processors of a first network device to:
- receive, via a routing protocol peering session with a peer router in a first autonomous system, a plurality of routing protocol routes to destination addresses, each routing protocol route of the plurality of routing protocol routes specifying a network address prefix and an identifier of the autonomous system that originated the routing protocol route;
- receive network address prefix ownership information from a distributed ledger storing a plurality of associations between respective network address prefixes and respective autonomous system identifiers of autonomous systems confirmed to own the respective network address prefixes;
- receive, from a second network device associated with a second autonomous system, threat pattern data indicating patterns in routing protocol route changes in the second autonomous system;
- determine, based at least on the network address prefix ownership information and the threat pattern data, whether any of the plurality of routing protocol routes specifies an autonomous system identifier different than specified by the plurality of associations; and
- in response to determining that a route of the plurality of routing protocol routes specifies an autonomous system identifier different than specified by the plurality of associations, perform an action.

* * * * *